United States Patent
Day

[15] 3,678,296
[45] July 18, 1972

[54] ELECTRICAL SIGNAL SLOPE POLARITY CHANGE DETECTOR

[72] Inventor: Christopher C. Day, Newtonville, Mass.
[73] Assignee: American Optical Corporation, Southbridge, Mass.
[22] Filed: April 14, 1970
[21] Appl. No.: 28,442

[52] U.S. Cl. .................307/231, 328/114, 328/132, 307/318, 128/2.1 Z
[51] Int. Cl. .................................................H03k 5/20
[58] Field of Search ..............128/2.1 Z, 2.1 R; 307/231, 307/263, 236, 235 A; 328/114, 132

[56] References Cited

UNITED STATES PATENTS

| | | | |
|---|---|---|---|
| 2,861,239 | 11/1958 | Gilbert | 73/359 X |
| 3,340,867 | 9/1967 | Kubilek et al. | 128/2.1 Z X |
| 3,347,223 | 10/1967 | Pacela | 128/2.1 Z |
| 3,433,217 | 3/1969 | Rieke | 128/2.1 Z |
| 3,524,058 | 8/1970 | Robertson et al. | 128/2.1 Z X |
| 3,532,087 | 10/1970 | Horn et al. | 128/2.1 Z |
| 3,536,062 | 10/1970 | Horn | 128/2.1 Z |
| 3,545,429 | 12/1970 | Pelta | 128/2.1 Z |
| 3,572,317 | 3/1971 | Wade | 128/2.1 R |

Primary Examiner—Kyle L. Howell
Attorney—William C. Nealon, Noble S. Williams and Robert J. Bird

[57] ABSTRACT

An electrical signal slope polarity change detector. A circuit for detecting changes in slope polarity of an electrical input signal and for providing an output indication of each slope polarity change. The circuit utilizes an amplifier with negative feedback which changes substantially its value of feedback impedance during a change in slope polarity of the input signal. The input signal is capacitively coupled to the amplifier input. The circuit is, within limits, insensitive to input signal variations in amplitude, frequency, and offset level.

4 Claims, 6 Drawing Figures

PATENTED JUL 18 1972

*INVENTOR.*
CHRISTOPHER C. DAY

BY Noble J. Williams
ATTORNEY

PATENTED JUL 18 1972 3,678,296

INVENTOR.
CHRISTOPHER C. DAY
BY
Noble S. Williams
ATTORNEY

ELECTRICAL SIGNAL SLOPE POLARITY CHANGE DETECTOR

BACKGROUND

In the broad field of electronic signal processing one can use various types of circuitry to perform many functions. For example, circuitry exists which will perform the functions of differentiation, integration, comparison, threshold detection, peak detection, sampling, amplification, attenuation, etc. My circuitry performs the function of detecting and indicating slope polarity change of an input signal.

An electronic signal whose amplitude is proportional to a physical quantity is the analog of that quantity. For example, an electrical signal which corresponds to respiration rate of a human being is an analog of that quantity. Respiration rate information can be obtained from the peaks and valleys of such a signal. This information may be extracted upon detection of those peaks and valleys by monitoring.

A method for measuring the period of a signal would be to use what is termed a threshold detector. For constant value of threshold voltage this circuit will provide an output each time the signal exceeds the threshold. However, if the desired information is not peak amplitude but is the time approximating a peak, the threshold detector is not very useful. It may or may not provide an output for that point in time when the signal is close to its peak.

If one wishes to determine the exact point in time at which a peak or valley occurs one can use a differentiation approach to determine when the slope of the signal is zero, and to provide an output at that time. This would provide an output coinciding with the peak and valley of the signal.

However, certain of the above-mentioned circuitry possesses disadvantages; for example, the above circuitry may be sensitive to variations in input signal amplitude, frequency and offset level. The circuitry which is the subject of my present invention does not contain any of these disadvantages. The circuitry does provide definite and precise indications of the occurrence of a peak or valley of an input signal and thereby provides accurate periodic information.

Although my invention is applicable in almost any area of signal processing where one desires to determine the signal period or the occurrence of signal peaks or valleys, for ease of explanation I will refer to the circuitry in an impedance pneumograph of the type disclosed in my copending application Ser. No. 25,353, filed Apr. 3, 1970. The disclosure thereof is hereby incorporated by reference. An impedance pneumograph is a device that monitors a person's respiration by sensing the change in electrical impedance of a subject's thorax due to respiration or breathing. This apparatus is typically used in a hospital, or convalescent home, on a bed-ridden patient where the monitored respiration is generally displayed on a breath rate meter, indicating breaths per minute.

Prior breath rate monitoring techniques have utilized impedance pneumograph apparatus comprised of a pair of electrodes attached to the skin surface of a human being across the thoracic cavity region. These electrodes conduct current through the cavity in response to a source of electrical power conductively connected therebetween. The power source is usually a constant source of alternating current.

The thorax presents an electrical impedance to the electrodes which consists of two impedance components—a relatively steady value of thoracic impedance herein referred to as "mean thoracic impedance"; and a varying incremental value of thoracic impedance, herein known as "respirative impedance" due to the change in the cavity volume because of respiration. The constant current being conducted through the cavity multiplied by the total impedance gives the voltage between the electrodes. There are two voltage components—one steady voltage component resulting from the mean thoracic impedance and one varying voltage component resulting from the respirative impedance.

The signal of interest is the varying voltage component, and various signal processing techniques to obtain this signal can be employed. Prior art methods of processing this signal include well-known techniques and are disclosed in my copending application identified above.

Within the modulation approach to signal processing, the breathing analog output from a D.C. amplifier is fed into a Schmitt trigger. A Schmitt trigger is a device which will perform a squaring function and it has a built-in input trigger hysteresis. An input signal to the Schmitt trigger causes a positive output for voltage V1 or greater, and causes the Schmitt trigger to have a zero output for voltage V2 or less where V2 is less than V1 by some finite voltage. If, for example, the input signal to the Schmitt trigger has peaks or valleys which do not fall outside of the hysteresis band these peaks and valleys within the hysteresis band will go undetected providing inaccuracies of breath rate. The incorporation of my circuit between the D.C. amplifier and the Schmitt trigger solves this problem.

1. It is thus an object of my invention to provide improved circuitry.

2. An additional object of my invention is to provide a circuit which will detect points of zero slope on an input signal wave form where the circuit is insensitive within limits, to variations in input signal amplitude, frequency and offset level change.

3. It is a further object of my invention to provide an improved impedance pneumograph utilizing the circuitry of my present invention.

BRIEF DESCRIPTION

The invention relates to an electrical circuit for detecting the "slope polarity change" of an electrical input signal. "Slope polarity change" as used in this description is intended to mean a change in slope from positive to negative, negative to positive, positive to zero, zero to positive, negative to zero, and zero to negative. The circuit comprises a high gain, high input impedance operational amplifier, with negative feedback means comprised of back to back zener diodes of equal breakdown voltage. The input signal is capacitively coupled to the inverting input to the amplifier, and the feedback diodes are connected between the amplifier output and inverting input.

Consider the input signal to be supplied by a low impedance source. In a specific impedance pneumograph, yet to be described, the circuit is placed between a low impedance D.C. amplifier which generates the input signal to the circuit, and a Schmitt trigger to which the output is conducted. Although the circuit is not limited to being driven by a low impedance source, for purposes of illustration, this approach is the most straightforward as will be described.

DRAWINGS

DETAILED DESCRIPTION

Figure 1:
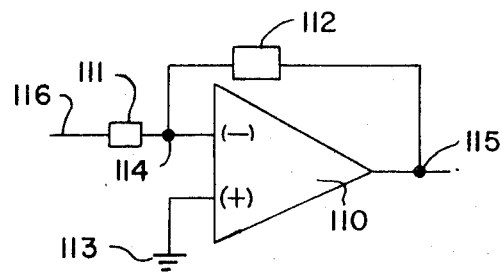
FIG. 1 is a representation of an ordinary operational amplifier circuit arrangement.

Prior to describing my present invention in detail, prudence dictates discussion of one of its circuit building blocks—the operational amplifier. FIG. 1 shows a basic negative feedback operational amplifier 110, with input impedance 111 and feedback impedance 112. Node 114 is termed the "summing point," terminal 116 is the input and terminal 115 is the output. Feedback impedance 112 is connected between the output 115 and the summing point 114, which is the inverting input (−) to amplifier 110. "Impedance" is a word used to describe the impeding effect that a circuit element has on current passing therethrough, when a voltage is applied thereacross. Impedance can be resistive, inductive, capacitive and combinations thereof, and can vary as a function of frequency, voltage etc. In operation any positive signal applied to terminal 116 will be amplified by amplifier 110, but will appear on the output 115 as a negative signal and vice versa. The ratio of the magnitudes of output signal to input signal is equal to the ratio of the values of feedback impedance 112 to input impedance 111.

Characteristics of operational amplifiers are high input impedance, low output impedance, and high open loop gain which is the gain with impedance 112 removed (closed loop gain is equal to impedance 112/impedance 111). Current flow into or out of the inverting (−) and non-inverting input (+) terminals is very small because of high input impedance. The voltage between those terminals is very small because of negative feedback as shown and will be very close to ground or common potential 113. My invention utilizes these typical characteristics.

Figure 2:
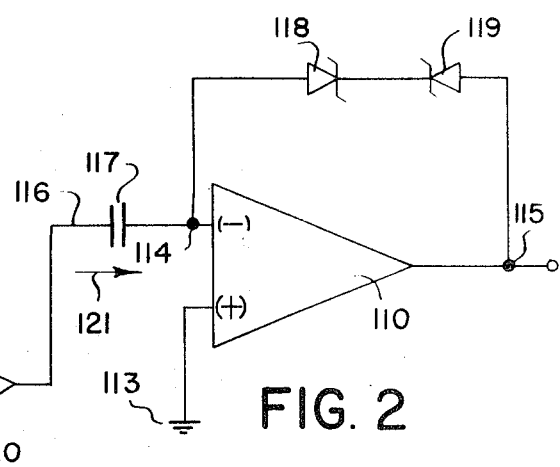
FIG. 2 is a partial schematic—partial block diagram of my present invention.

FIG. 2 is a schematic diagram of my present invention. The input signal to the circuit appears on conductor 116 from a low impedance source 120. The input signal is capacitively coupled through capacitor 117 corresponding to the input impedance 111 of FIG. 1, to the summing point 114 of amplifier 110. Amplifier output 115 is conductively connected to summing point 114 through zener diodes 118 and 119, corresponding to the feedback impedance 112 of FIG. 1. Zener diode 118 will conduct in its zener breakdown voltage mode when the voltage of the amplifier output 115 is more positive than the voltage on the summing junction 114 by an amount equal to the breakdown voltage $V_z$ of zener diode 118.

In the application of zener diodes 118 and 119 to my invention, I use them in a "back to back" arrangement. When zener diode 118 is conducting in its zener breakdown mode, zener diode 119 is conducting as an ordinary diode and vice versa. An ordinary diode may have a typical forward voltage drop of 0.5 volts. Zener diodes 118 and 119 are selected to each have a zener breakdown voltage of $V_z$. Therefore, when current flow exists through the back to back zener arrangement, the total voltage thereacross will approximately $\pm(V_z + 0.5)$ herein referred to as $\pm V_z'$.

For example, when current flow is from output 115 to summing point 114, zener diode 119 experiences a forward voltage drop of 0.5 volts, and zener diode 118 is in its zener breakdown mode and experiences a reverse voltage (zener breakdown voltage) of $V_z$. The sum of the voltages across both diodes is herein defined as $+V_z'$, since the amplifier output is positive with respect to the summing point. Similarly, zener diode 119 will conduct in its zener breakdown voltage mode when amplifier output 115 is more negative in voltage than summing point 114 by an amount equal to 0.5 volts plus the breakdown voltage of zener diode 119 giving rise to a feedback voltage of $-V_z'$.

Non-inverting input (+) is conductively connected to ground or common 113. Therefore, as previously explained in conjunction with FIG. 1, the inverting input (−) or summing point 114 will not vary considerably from the voltage at the non-inverting input (+) and will remain close to ground or common.

In operation, initially consider the signal voltage on conductor 116 to be zero, and the charge on capacitor 117 to be zero whereby amplifier output 115 is at zero also. Because the amplifier 110 is in a state whereby output 115 is not at plus $V_z'$ or minus $V_z'$, zener diodes 118 and 119 are both in a non-breakdown voltage mode. The impedance of a zener diode is high in such a mode. Therefore, the input impedance at summing point 114 is high.

Now assume that the signal from low impedance source 120 as can be observed on conductor 116 is increasing positive. The impedance initially presented to this positive increasing signal by capacitor 117 is low in comparison with the impedance presented to that signal by the input impedance of amplifier 110 when zener diodes 118 and 119 are not conducting. Therefore, the input signal initially is "felt" at summing point 114 causing amplifier 110 to provide an output at point 115 equal to the inverse of the input multiplied by the amplifier gain. When the output reaches minus $V_z'$ zener diode 119 conducts in its zener breakdown mode. In effect this clamps the output 115 to the summing point 114 by a difference of $V_z'$. As zener diode 119 conducts, the input impedance at summing point 114, looking into the inverting input of the amplifier, becomes very low. It is low because any excess current from capacitor 117 is shunted by a low impedance path through zener diode 119 through the amplifier output 115. Recall that the voltage between the inverting and non-inverting inputs to amplifier 110 remain very close in value. Therefore, inverting input (−) appears to capacitor 117 as if it is conductively connected to ground or common. In the electronic art, summing point 114 is described as a "virtual ground." Any further input signal increases on conductor 116 will therefore charge capacitor 117 in voltage, with respect to the "virtual ground."

If input signal 116 stops increasing, and starts to decrease as if it had passed through a positive peak of a sinusoidal wave, from an equation describing capacitor current flow.

$$i = C(dv/dt) \qquad (1)$$

one observes that when $dv/dt = 0$ then $i = 0$. Current 121 passing through capacitor 117 equals 0 when the input signal is at the sinusoidal peak. Because the amplifier 110 requires a small but finite input current into its inverting input (−) at summing point 114 to maintain amplifier 110 in a "clamped" state, and since the current 121 has been reduced to 0 at the present point in time, amplifier 110 therefore changes its state. The voltage on output 115 changes from minus $V_z'$ through 0 to plus $V_z'$.

The reason for this change of state from negative to positive can be determined by considering the impedance which the input signal "sees" at conductor 116. When the signal is at its positive peak, the impedance seen is a capacitor in series with a very large resistor, the resistor being the equivalent of the input impedance at summing point 114 when the amplifier is in a "non-clamped" state. As the input signal starts to decrease from its positive peak on conductor 116, capacitor 117 would like to discharge. But capacitor 117 cannot discharge because of the high impedance in its discharge path presented by the non-conducting zener diodes 118 and 119. Therefore, the voltage across capacitor 117 cannot change instantaneously with the decrease in signal amplitude on conductor 116 and the voltage on capacitor 117 remains essentially constant. Accordingly, the voltage at summing point 114 will decrease a small but finite amount at the same rate at which the signal on conductor 116 decreases during the time when amplifier 110 is in a high impedance state. However, as soon as the voltage on summing point 114 is brought down slightly negative the amplifier 110 amplifies this negative input voltage at summing point 114. Output 115 of the amplifier 110 then goes positive and is clamped this time at plus $V_z'$ by zener diode 119 conducting in a zener mode. Therefore, it is observed that when an input signal on conductor 116 moves through a positive peak or slope polarity change, that output 115 changes in voltage by an amount equal to $2V_z'$. This output change occurs substantially simultaneously with the input slope polarity change.

The operation of my invention is similar when described for a signal which initially increases in a negative direction and then reverses itself to increase in a positive direction—as at the bottom of a sinusoidal wave form. The output 115 changes from positive $V_z'$ to negative $V_z'$, for this input signal polarity change.

Figure 3:
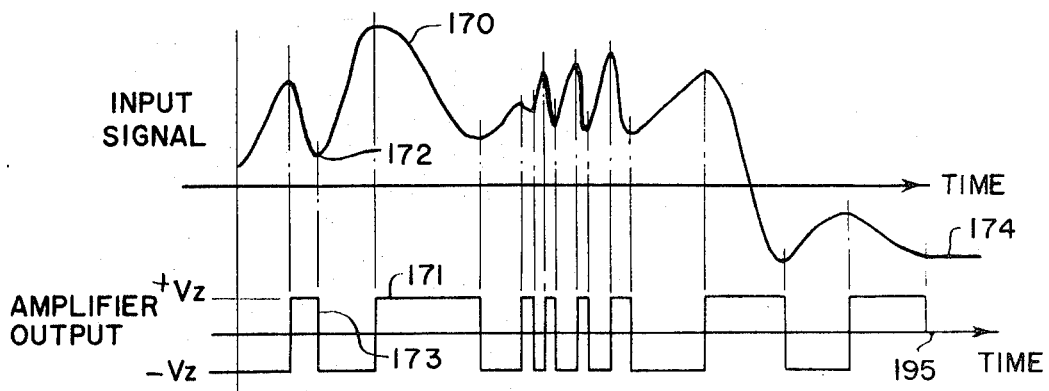
FIG. 3 is a graphical representation of the output signal from the present invention compared in proper time relationship with the input signal to my present invention.

FIG. 3 is a graphical representation of two wave forms compared in proper time relationship, where the upper wave form is the input signal on conductor 116 to my invention and the lower wave form is the amplifier output 115 from my invention. The amplifier output changes state from plus $V_z'$ to minus $V_z'$ or vice versa for every input signal slope polarity reversal. For example, at point 172 on the input signal wave form amplifier output varies from plus $V_z'$ to minus $V_z'$. At point 170 on the input signal wave form the slope is negative and not changing polarity, and the corresponding amplifier output is shown as a constant value at point 171.

For every slope polarity change of input signal there is a change in amplifier output from minus $V_z'$ to plus $V_z'$ or vice versa with one exception. Observe that the portion of the input signal denoted by 174 possesses a zero slope and is non-varying therefrom. The corresponding amplifier output is approximately equal to zero voltage as shown at 175, subject to drifting conditions.

Figure 4:
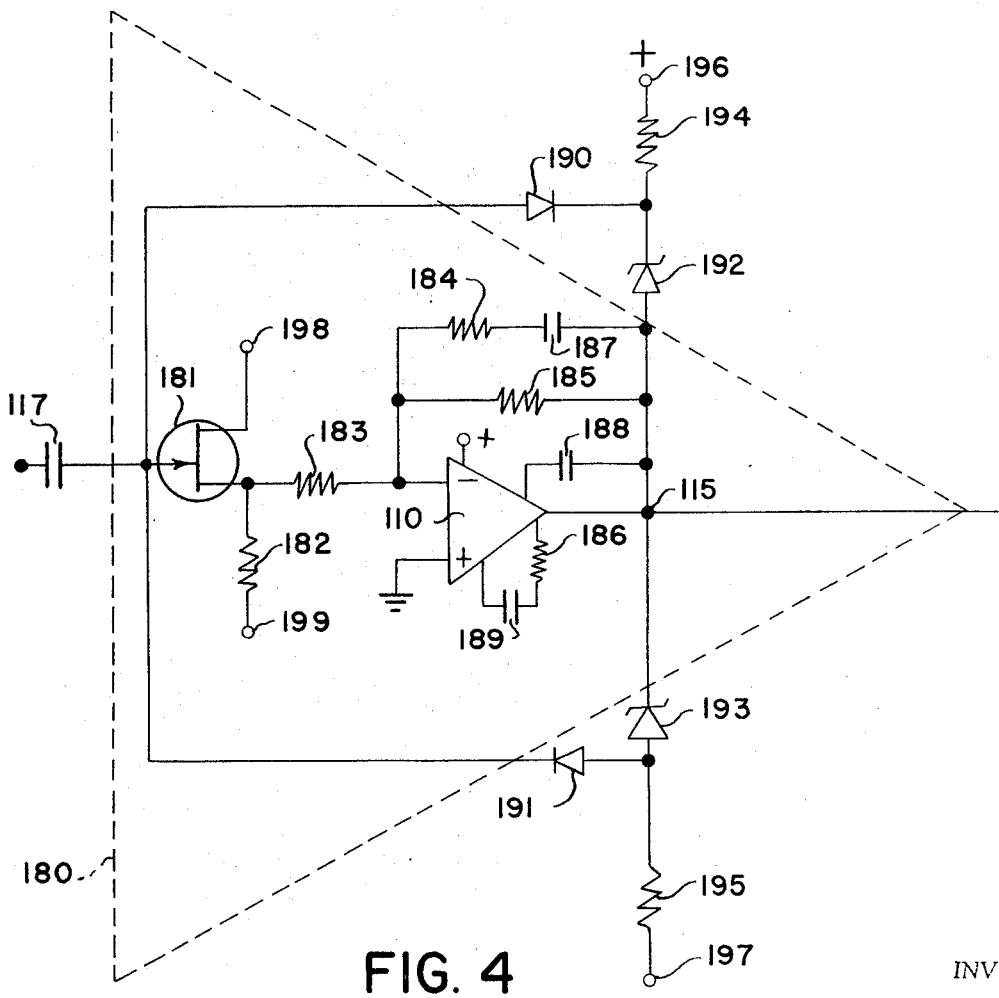
FIG. 4 is a schematic diagram of an embodiment especially useful in the impedance pneumograph.

FIG. 4 is the preferred embodiment of the present invention and is used in the impedance pneumograph. Amplifier 180 comprises an operational amplifier 110 with a field effect transistor 181. Field effect transistor 181 provides an even higher input impedance than that presented by operational amplifier 110 alone. The other electronic components within the triangle representing amplifier 180 are incorporated for purposes of frequency stabilization and gain compensation.

Diode 190 and zener diode 192 are functionally equivalent to zener diode 119; diode 191 and zener 193 are functionally equivalent to zener diode 118. These functional equivalents provide a higher non-conducting impedance than that obtainable with zener diodes 118 and 119 alone. Current is conducted from terminal 196 through resistor 194, zener diodes 192 and 193, and resistor 195 to negative terminal 197. Zener diodes 192 and 193 are continually maintained in a zener breakdown state.

When amplifier output 115 equals zero volts, both diode 190 and diode 191 are reverse biased each by a voltage equal to the breakdown voltage of zener diodes 192 and 193 respectively. When amplifier output 115 varies from zero volts, negative voltage for example, the voltage at the junction of diode 190, zener diode 192 and resistor 194 will likewise decrease, thereby providing a current path from capacitor 117 through diode 190 and zener 192 into amplifier 110 to ground. Similarly, if the amplifier output 115 goes positive, the voltage at the junction of diode 191, zener diode 193, and resistor 195 also moves in a positive direction, thereby providing a current flow path from that junction to capacitor 117. The circuit of FIG. 4 is the embodiment, especially suitable for use in an impedance pneumograph and is the preferred embodiment.

The embodiment of my invention as it is employed in an impedance pneumograph comprises the following component values,

| Capacitors | 117 | 1 μf |
|---|---|---|
|  | 187 | .047 μf |
|  | 188 | .300 pf |
|  | 189 | 100 pf |
| Resistors | 182 | 20K |
|  | 183 | 2K |
|  | 184 | 2K |
|  | 185 | 470K |
|  | 186 | 1.5K |
|  | 194 | 20K |
|  | 195 | 20K |
| Diodes | 190 | FD333 |
|  | 191 | IN5231A |
|  | 192 | FD333 |
|  | 193 | IN5231A |
| Transistor | 181 | 2N4302 |
| Amplifier | 110 | MC 1437 |
| Voltages (D.C.) | 196 | +15V. |
|  | 197 | −15V. |
|  | 198 | +15V. |
|  | 199 | −15V. | where μf = microfarad, pf = picofarad, K = kilohm and V = volts.

Figure 5:
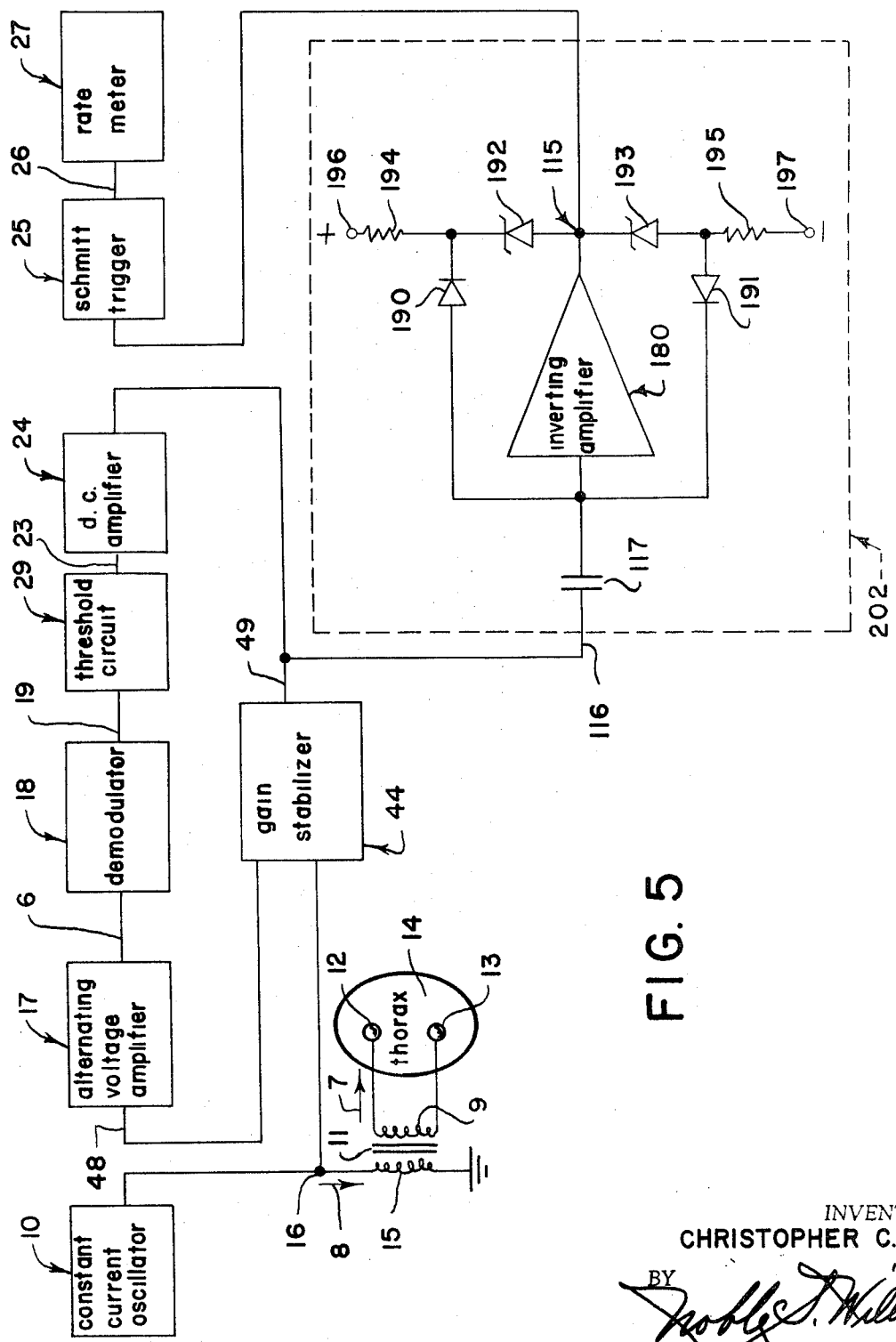
FIG. 5 is a block diagram of an improved impedance pneumograph, showing relative placement of my present invention therein.

FIG. 5 is a block diagram illustrating a placement of my slope polarity change detector 202 within the system of an impedance pneumograph to provide an improved pneumograph. The input signal for capacitor 117 is provided by low output impedance D.C. amplifier 28 and the output from detector 202 is conducted to Schmitt trigger 25, as shown.

A constant current oscillator 10 drives the primary winding 15 of transformer 11 whereby through transformer coupling, secondary winding 9 conducts secondary current 7 through the thorax 14 of a mammalian subject (not shown) via electrodes 12 and 13. This invention is not limited to monitoring respiration of a mammalian subject only, but can be used to monitor respiration of any living creature that breathes. The reflected impedance of the thorax 14 multiplied by the current 8 in primary winding 15 determines the primary voltage at node 16. Node 16 is conductively connected, and provides an input, to gain stabilizer 44.

The voltage at the input 48 of alternating voltage amplifier 17 is established by gain stabilizer 44, and a 50 KHZ carrier which is amplitude modulated by thoracic impedance changes to a typical depth of 0.5 percent. Alternating voltage amplifier 17 amplifies both the carrier component and the modulation component, and the output of amplifier 17 is conductively connected by conductor 6 to the input of de-modulator 18. De-modulator 18 removes half of the modulated carrier, for example, the negative polarity, filters out the carrier frequency component, and peak detects, providing at its output 19 a D.C. signal which varies in amplitude as a function of the modulation, the offset of which represents the carrier amplitude. This varying D.C. signal is conducted to threshold circuit 29 which removes the offset D.C. signal but passes the varying portion of the signal which comprises the modulation component, to the input 23 of D.C. amplifier 24.

Threshold circuit 29 has its level set to a value corresponding to the average de-modulated carrier voltage which is held approximately constant by gain stabilizer 44, allowing the modulation signal to pass. The threshold circuit 29 has no inherent correction time. D.C. amplifier 24 amplifies the modulation component to give the proper level on conductor 28 which is connected to the input of the slope polarity change detector 202 for activation thereof. D.C. amplifier 24 also amplifies any change in offset level that passes through threshold circuit 29 due to a carrier level change as a result of a large thoracic impedance change. It is because of the amplification of this D.C. offset change, which varies the ratio between the value of the modulation component and the average value of the de-modulated carrier, that a gain stabilizer is required.

Gain stabilizer circuit 44 receives one of its inputs from the output of D.C. amplifier 24 via conductive lead 49, and another input from the primary side of transformer 11. The output of stabilizer 44 provides an input to amplifier 17.

Slope polarity change detector 202 provides an output to Schmitt trigger 25 which in turn provides an input to rate meter 27. Rate meter 27 itself provides fixed amplitude/constant width pulses from the Schmitt trigger 25 output for purposes of averaging. Rate meter 27 indicates breaths per unit time, and typically breaths per minute.

Figure 6:
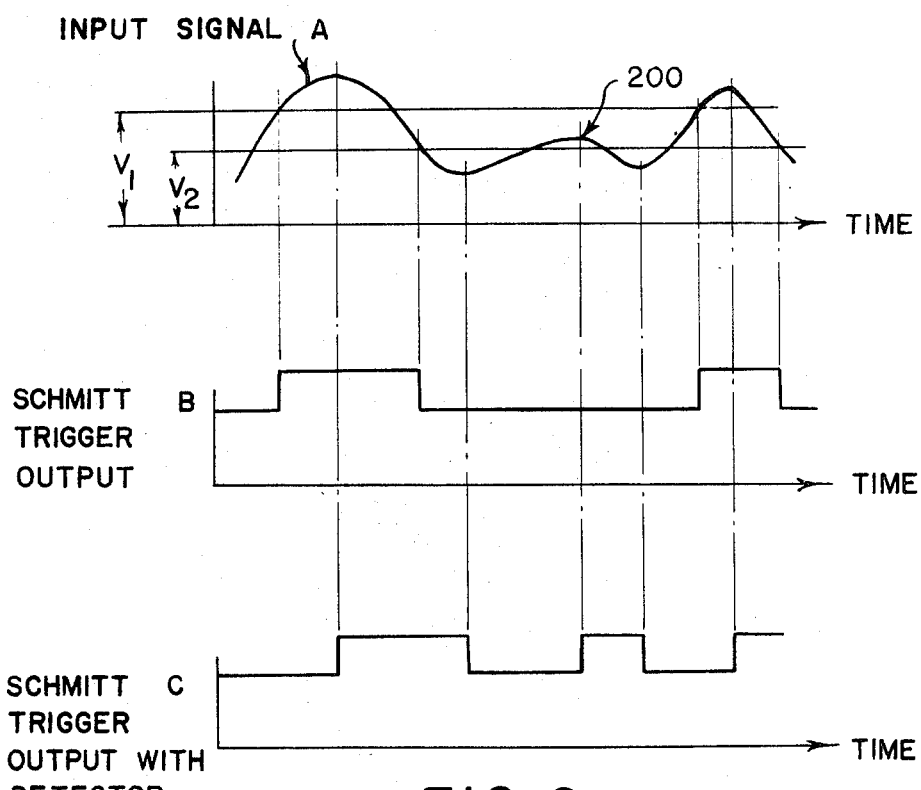
FIG. 6 is a graphical representation of wave forms compared in proper timed relationship showing the Schmitt trigger output that results from a given input signal both with and without the use of the present invention.

FIG. 6 is a graphical representation of input and output wave forms for a Schmitt trigger circuit. Wave form A is an input signal where the Schmitt trigger circuit has a hysteresis voltage input denoted by the difference between voltages V1 and V2. Wave form B shows the Schmitt trigger output as being positive when the input signal is equal to voltage V1 and increasing positive, and as being zero when the input signal is equal to V2 and going negative. In wave form A at point 200 corresponding to the end of inhalation or exhalation of a breathing subject, observe that this respiration information goes undetected by the Schmitt trigger output; the slope change of the signal occurs within the hysteresis band defined by voltages V1 and V2.

Referring to wave form C—the Schmitt trigger output after its input signal is processed by my present invention—it is seen that point 200 is detected. This provides breath rate meter 27 with a more accurate indication of the breath rate of the breathing subject.

Recapitulating, in operation, any input signal which is increasing or decreasing in amplitude as a function of time possesses a finite slope. The current through a capacitor can be expressed by the known equation $$i = C(dv/dt), \qquad (1)$$

wherein $i$ is the current, $C$ is the capacitance and $dv/dt$ is the change of voltage amplitude with respect to a change in time or the slope of the input signal. Therefore, a positive or negative slope will provide a positive or negative current respectively through the capacitor, the current magnitude depending on the slope magnitude, providing the summing point is at virtual ground.

The operational amplifier amplifies the input signal presented to its inverting input. The output of the amplifier goes negative if the input goes positive and vice versa. However, in the circuit of my invention, the amplifier output cannot differ from the amplifier input by a voltage exceeding approximately the feedback zener breakdown voltage, because the zener diodes are placed between input and output.

Accordingly, when the input signal to the capacitor is increasing positive, the amplifier output will normally be at minus $V_z$, where $V_z$ is the zener breakdown voltage. The input current from the capacitor will be shunted through the conducting zener from input to output. A very small, but finite current into the inverting input of the amplifier is required to maintain the state of the amplifier and of course is supplied from the capacitor.

Now, consider the input signal to stop increasing in a positive direction. From equation (1) it can be seen that when the input voltage stops increasing with time, $dv/dt = 0$. Therefore, the current through the capacitor is zero, and the current into the amplifier input and the current shunted through the breakdown zener is zero. At this point in time, the amplifier output goes from negative voltage to zero, providing an indication of slope polarity change to any appropriate monitoring means.

If the input voltage does not vary from the value at which it stopped, then the output from the amplifier remains approximately at zero. If the input voltage either increases or decreases after being immobile for a finite length of time, the amplifier output will move negative or positive respectively.

If the input does not come to rest at some positive voltage, as for example at the top of a sinusoidal input wave form, then the amplifier output would not have stopped at zero; it would have moved from $-V_z'$ through zero to $+V_z'$. The reason for this is that the slope in equation (1) is negative after the input signal has passed through its sinusoidal peak, and current is then no longer flowing into the amplifier inverting input. It is flowing from the amplifier inverting input into the capacitor causing the amplifier output to go positive. Therefore, an indication of slope polarity change is given by the output of the amplifier in moving from $-V_z'$ to $+V_z'$, when the input signal passes through a positive peak, and similarly gives an indication from $+V_z'$ to $-V_z'$ when the output passes through a negative peak.

The capacitor cannot discharge when the amplifier output is zero or when the zener diodes are not in a breakdown region because the discharge impedance presented to the capacitor during this state of the amplifier is in the hundreds of megohms region. The capacitor can discharge only if the following two conditions exist: a feedback zener is in a low impedance breakdown region and the input signal amplitude is moving in a direction tending to not increase the charge across the capacitor. Then the capacitor will discharge at the rate of the input signal amplitude change. Recall that we assumed a zero source impedance for the input signal, and adequate drive capability for the amplifier. If there were a finite source impedance the capacitor would charge and discharge at a rate lower than that of the signal increase and decrease, due to the time constant established by the source impedance and the capacitance. When being driven by a low or near zero source impedance, this circuit adjusts itself to the input signal substantially instantaneously.

One will observe that the slope polarity change or reversal of the input signal can occur and be detected by my circuit at various average levels both positive and negative, at various frequencies, and at different values of D.C. offset, without affecting the indicating mechanism. However, the only limits imposed upon the allowable input signal parameter variations are those limits of the detecting circuitry itself, i.e.: frequency response of the amplifier, drive capability of the amplifier, breakdown voltage of the capacitor, current carrying capability of the zener diodes, etc.

Where breath rate monitoring is desired, the signal information is provided by a transducer, attached to a breathing subject, and respiration rate information can be extracted from the slope polarity changes. These changes correspond to the end of inhalation and the end of exhalation. Therefore, the circuitry of the present invention is particularly applicable to the problem of detecting and indicating these changes.

The preferred embodiment of the present invention uses ordinary diodes that are arranged to function as zener diodes. It is inserted between a D.C. amplifier output which supplies the signal input to the embodiment and a Schmitt trigger which receives the signal output from this embodiment providing an indication of slope reversal. The Schmitt trigger can be used for signal squaring prior to processing of the signal in a breath rate meter. Because a Schmitt trigger circuit has a hysteresis input voltage dead band, any slope reversal of a signal fed directly from the D.C. amplifier to the Schmitt trigger which occurs within this hysteresis band will go undetected, providing breath rate error. The use of the slope polarity change detector prevents this error from occurring.

From the two embodiments of my invention disclosed herein, it would be understood that other changes can be made in the details, arrangements of components, and components themselves, without departing from the spirit and scope of the invention as defined by the appended claims.

I claim:

1. A slope reversal detector for detecting changes in the polarity of the slope of an input signal comprising operational amplifier means having an output terminal and inverting and non-inverting input terminals; reference potential source means connected to said non-inverting input terminal; capacitor means for coupling an input signal to said inverting input terminal; and feedback means connected between said output terminal and said inverting input terminal; said feedback means including breakdown means and being operative to present a very low impedance when the potential of either polarity across it exceeds a predetermined breakdown magnitude and to present a very high impedance when the potential of either polarity across it is less than said predetermined breakdown magnitude.

2. A slope reversal detector in accordance with claim 1 wherein said breakdown means includes a pair of oppositely poled Zener diodes connected between said output terminal and said inverting input terminal.

3. A slope reversal detector in accordance with claim 1 wherein said feedback means includes a pair of oppositely poled Zener diodes connected in series between said output terminal and said inverting input terminal.

4. A slope reversal detector in accordance with claim 1 wherein the potential of said reference potential source means is ground, and positive and negative potentials at said output terminal represent respectively negative and positive slopes of said input signal.

* * * * *